United States Patent

Bodary et al.

[11] Patent Number: 5,972,169
[45] Date of Patent: Oct. 26, 1999

[54] SLURRY PREFORM SYSTEM

[75] Inventors: Joseph A. Bodary, Utica; Bruce N. Greve, Clarkston; Terry G. Wells, Burton, all of Mich.

[73] Assignee: The Budd Company, Troy, Mich.

[21] Appl. No.: 09/007,356

[22] Filed: Jan. 15, 1998

[51] Int. Cl.⁶ .............................. D21F 13/00; D21J 1/00; D21J 3/00
[52] U.S. Cl. ...................... 162/218; 162/219; 162/228; 162/382; 162/389; 162/390; 162/399; 425/84; 264/86
[58] Field of Search .................................... 162/218, 219, 162/227, 228, 116, 382, 387, 388, 389, 394, 395, 396, 398, 399, 220, 383, 390, 393, 224, 225, 222, 223; 425/84; 264/86

[56] References Cited

U.S. PATENT DOCUMENTS

| | | |
|---|---|---|
| 1,549,903 | 8/1925 | Buel . |
| 1,616,222 | 2/1927 | Harrigan . |
| 1,676,798 | 7/1928 | O'Brien . |
| 1,918,782 | 7/1933 | Randall . |
| 2,460,129 | 1/1949 | Ista . |
| 2,471,932 | 5/1949 | Chaplin . |
| 2,526,125 | 10/1950 | Francis, Jr. . |
| 2,609,733 | 9/1952 | Honnig ...................................... 162/227 |
| 2,780,147 | 2/1957 | Richter . |
| 2,962,762 | 12/1960 | Hartmann et al. . |
| 3,014,835 | 12/1961 | Feigley, Jr. et al. . |
| 3,016,090 | 1/1962 | Chaplin .................................... 162/227 |
| 3,167,469 | 1/1965 | Wells ....................................... 162/227 |
| 3,261,740 | 7/1966 | Wells . |
| 3,284,284 | 11/1966 | Wells . |
| 3,287,208 | 11/1966 | Peppler .................................... 162/227 |
| 3,325,349 | 6/1967 | Reifers . |
| 3,373,079 | 3/1968 | Eastman et al. . |
| 3,687,587 | 8/1972 | Wiltshire . |
| 4,162,935 | 7/1979 | Kollmann et al. . |
| 4,204,907 | 5/1980 | Korklan et al. . |
| 4,323,426 | 4/1982 | Cowan et al. . |
| 4,460,023 | 7/1984 | Mullaney . |
| 4,647,415 | 3/1987 | Schafft . |
| 4,740,346 | 4/1988 | Freeman . |

(List continued on next page.)

FOREIGN PATENT DOCUMENTS

| | | |
|---|---|---|
| 587989 | 12/1959 | Canada . |
| 1301515 | 5/1992 | Canada . |
| 0 341 977 A2 | 11/1989 | European Pat. Off. . |
| 47-7726 | 3/1972 | Japan . |
| 1 511 185 | 5/1978 | United Kingdom . |

OTHER PUBLICATIONS

Keown, J. A., and Curtis, R. W., Article of The Cincinnati Milling Maching Co. entitled "Wet Slurry Process brings precision to Reinforced Plastics", p. 22, undated.

Primary Examiner—Peter Chin
Assistant Examiner—Kevin Cronin
Attorney, Agent, or Firm—Harness, Dickey & Pierce, P.L.C.

[57] ABSTRACT

An efficient, low cost method and apparatus for controlling fiber deposition in a fiber reinforced preform is provided. In the method, a main screen is placed in a tank filled with liquid. The main screen has a major surface, upright side walls and a plurality of openings formed therein. Reinforcing fibers are added to the liquid to create a slurry. The main screen is raised through the slurry to a level beneath the top of the slurry, thereby causing the reinforcing fibers to be deposited on the main screen. A retainer screen is inserted into the slurry so that the reinforcing fibers are sandwiched between the main screen and the retainer screen. Both the main screen and retainer screen are raised out of the tank effectively forming a preform with minimal deformation. An alternative embodiment includes a bubbler zone control device for mixing the slurry. The tank is divided into separate areas or zones whereby the supply of fluid to each bubbler zone is controlled. The bubbler zone controller may be used to initiate or diminish a vortex in the slurry as the screen is being raised out of the tank. Another embodiment includes a fiber dispenser controller for sequentially adding different fibers to the slurry.

7 Claims, 11 Drawing Sheets

U.S. PATENT DOCUMENTS

| | | |
|---|---|---|
| 4,818,448 | 4/1989 | Wrenn, Jr. et al. . |
| 4,849,147 | 7/1989 | Freeman . |
| 4,863,771 | 9/1989 | Freeman . |
| 5,039,465 | 8/1991 | Freeman et al. . |
| 5,286,326 | 2/1994 | Greve . |
| 5,407,631 | 4/1995 | Salisbury . |
| 5,443,692 | 8/1995 | Emery . |
| 5,685,956 | 11/1997 | Greve . |

SLURRY PREFORM SYSTEM

BACKGROUND OF THE INVENTION

The present invention relates generally to forming fiber reinforced plastic preforms and, more particularly, to a method and apparatus for controlling fiber deposition in a fiber reinforced preform.

Fiber reinforced plastic (FRP) parts or composite parts are well known and used in a wide variety of applications. An FRP part generally consists of a plastic shape in which carbon, fiberglass, or other reinforcing fibers are dispersed in order to provide strength to the component. One method of making an FRP part is known as resin transfer molding (RTM).

In RTM, fibrous material in a mold is injected with resin which cures to form the part. Examples of these techniques are disclosed in commonly assigned U.S. Pat. Nos. 4,740, 346—Perimeter Resin Feeding of Composite Structures; 4,849,147—Method of Making a Molded Structure Having Integrally Formed Attachment Members; and 4,863,771—Hollow Fiber Reinforced Structure and Method of Making Same, each of which is hereby specifically incorporated by reference. In RTM, fibrous material is often formed into a preliminary shape before being placed into the mold. The shaped sections generally conform to the contour of adjacent mold die surfaces and are known as preforms. Preforms have been constructed using several different manufacturing approaches. One such approach is to direct chopped fibers by means of a flow of air onto a screen. One problem with this technique is that it is difficult to obtain desired fiber orientation. Another method utilizes mats of fibrous material to make the preforms. This method, however, produces undesirable amounts of scrap material and is labor intensive, thus resulting in production cost inefficiencies.

Still another technique, known as a wet slurry process, is disclosed, for example, in Keown et al. ("Wet Slurry Process Brings Precision To Reinforced Plastics"). Keown discloses a slurry containing chopped fibers drawn by vacuum into a chamber covered by a screen. As a result, the fibers are deposited on the screen. This approach, however, is associated with certain disadvantages. For example, it is difficult to consistently obtain the desired fiber orientation and compactness of the fibers using this equipment. In addition, the pumps and other equipment required to create the vacuum and draw the slurry through the screen may be unduly complex and difficult to maintain. Furthermore, the process is relatively slow.

An improved wet slurry process is disclosed in commonly assigned U.S. Pat. No. 5,039,465—Method and Apparatus For Forming Fiber Reinforced Plastic Preforms From a Wet Slurry, which is also hereby incorporated by reference. The process disclosed therein teaches creating a preform by raising a screen through a tank containing a slurry of fibers resulting in the fibers being deposited on the screen. While this approach is promising, it also has some drawbacks. For example, structural integrity of the preforms may be compromised as the screen is raised out of the liquid. As long as the screen is moving beneath the surface of the slurry, pressure from the slurry forces the fibers on the screen and holds them in position. However, as soon as the screen breaks the plane of the top of the slurry as the preform is being removed from the tank, the liquid and fiber mixture surrounding the screen tends to rush into the interior cavity of the preform. As the slurry rushes into the preform, the upright side walls of the preform may collapse thereby creating a need for costly repair work or discard of the entire preform. Another challenge in the construction of fiber reinforced preforms is that of maintaining uniform wall thickness throughout the preform. While drawing the screen through the slurry, more liquid is forced through the major surface of the screen that is perpendicular to the direction of draw than the upright side walls that are parallel to the direction of movement of the screen. Because the quantity of fiber deposited on the screen is proportional to the amount of liquid forced through the screen, preforms constructed in this manner may contain sections of non-uniform thickness.

SUMMARY OF THE INVENTION

Pursuant to the present invention, an efficient, low cost method and apparatus for controlling fiber deposition in a fiber reinforced preform is provided.

In one embodiment, a main screen is placed in a tank filled with liquid. The main screen has a major surface, upright side walls and a plurality of openings formed therein. Reinforcing fibers are added to the liquid to create a slurry. The main screen is raised through the slurry to a level beneath the top of the slurry, thereby causing the reinforcing fibers to be deposited on the main screen. A retainer screen is inserted into the slurry such that the reinforcing fibers are sandwiched between the main screen and the retainer screen. Both the main screen and retainer screen are raised out of the tank effectively forming a fiber reinforced preform with minimal deformation.

In another embodiment, the apparatus includes a choke screen positioned adjacent the main screen to reduce the flow of liquid through that portion of the main screen as it is being drawn through the slurry. In order to optimize preform wall thickness, the choke screen may have openings formed therein which are offset in location or different in size from the openings in the main screen.

In another embodiment, a work cell is provided that includes a turntable disposed between the slurry tank and a furnace for efficiently mass producing the preforms.

In another embodiment, the apparatus includes a bubbler control device and separate bubbler zones. The control device is capable of sequencing bursts of air at varying pressures and durations for each of the bubbler zones. Uniformity of the slurry may be maximized by utilizing certain bubbler control sequences depending on the geometry of the preform.

In still another embodiment, the apparatus includes a fiber dispenser for controlling the addition of different types of fibers to the slurry. The fiber dispenser regulates the addition of various fibers in sequence timed to correspond with raising the main screen through the tank. By adding different types of fibers to the slurry during the upstroke of the main screen, a composite preform whose cross-section consists of different layers of materials may be constructed.

BRIEF DESCRIPTION OF THE DRAWINGS

The various advantages of the present invention will become apparent to one skilled in the art after reading the following specification and by reference to the drawings in which.

DETAILED DESCRIPTION OF THE PREFERRED EMBODIMENT

A. Summary

Figure 1:
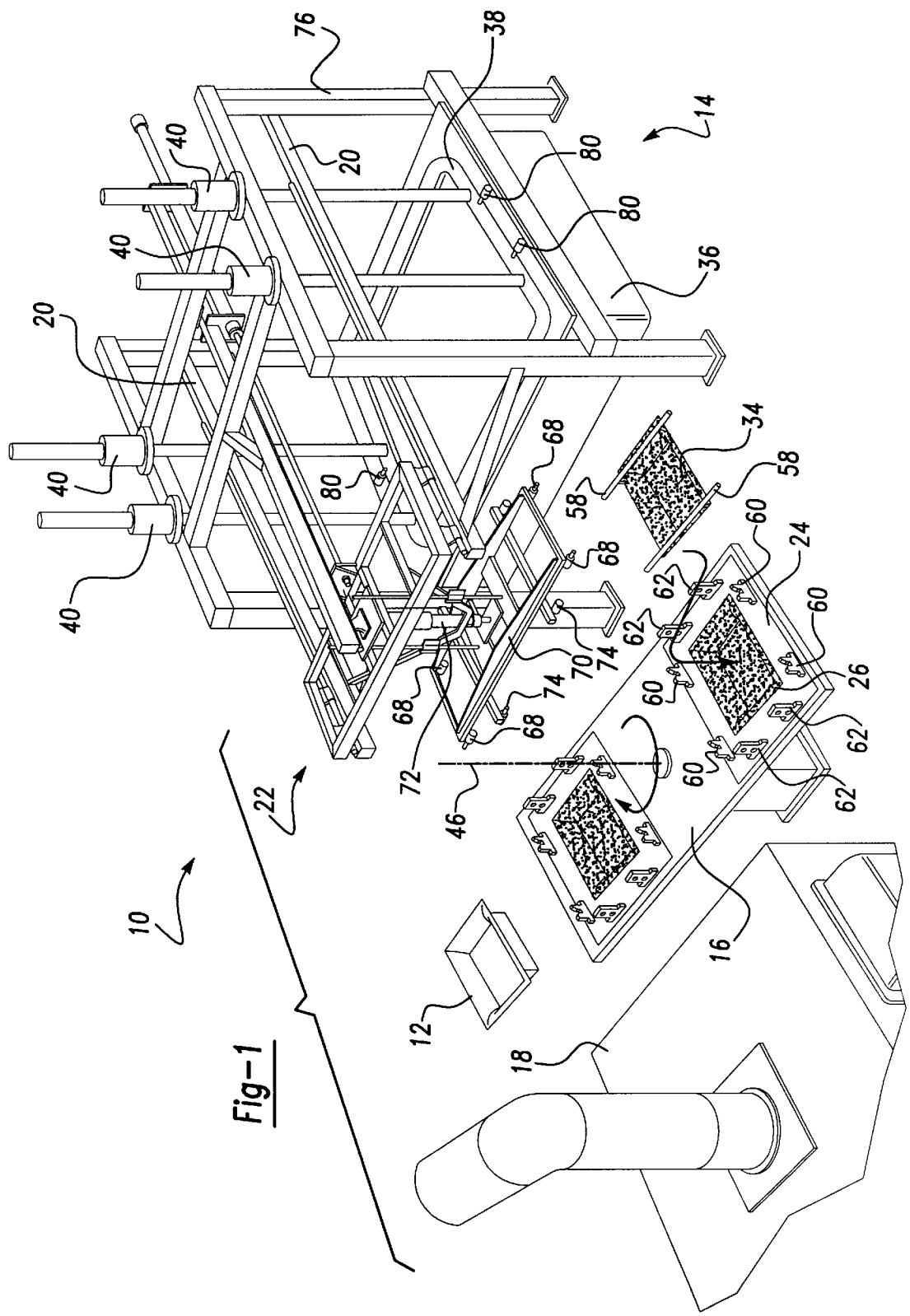
FIG. 1 is a perspective view of a work cell for creating fiber reinforced preforms from a wet slurry constructed in accordance with the teachings of the present invention.

Referring to FIG. 1, a work cell 10 for creating a fiber reinforced preform 12 from a wet slurry is shown. Work cell 10 consists of four stations including a tank station 14, a turntable 16, a furnace 18 and a cooling station (not shown). Turntable 16 is positioned within work cell 10 such that parallel rails 20 of tank station 14 extend over turntable 16 thereby providing overhead support for a pallet transfer mechanism 22. Furnace 18 is positioned adjacent turntable 16 to afford easy and efficient transfer of a pallet 24 between turntable 16 and furnace 18.

Figure 6:
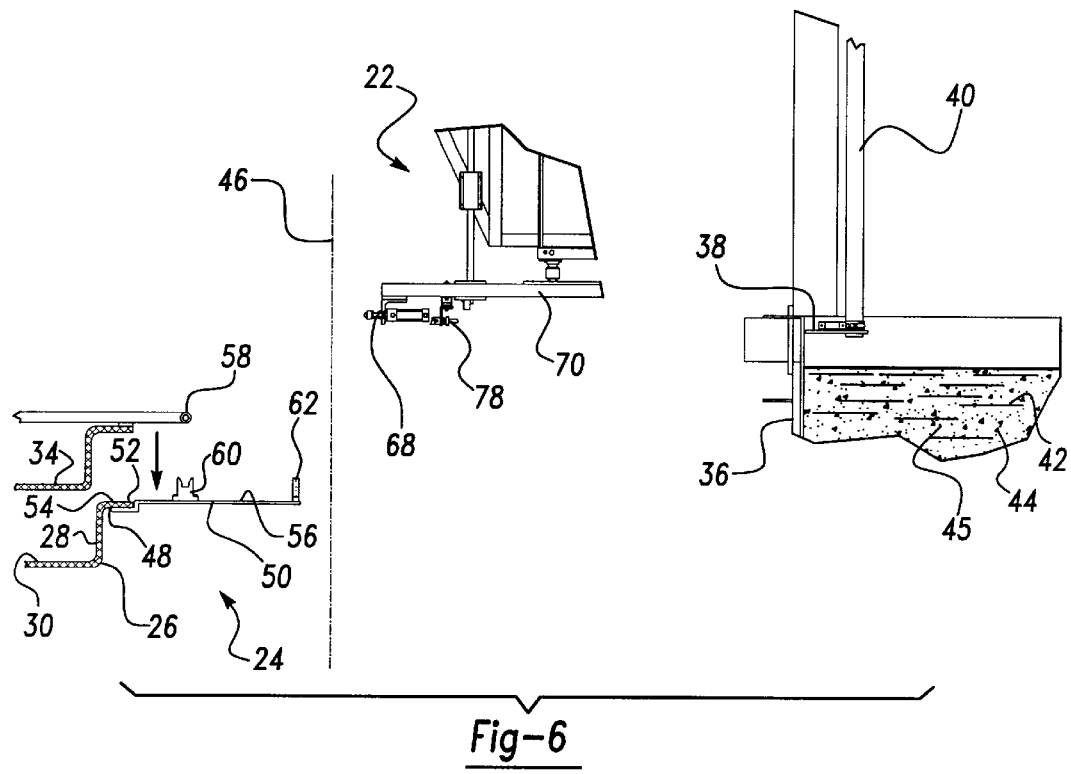
FIG. 6 is a partial sectional view of the work cell partially broken away to illustrate the order of operations.
Figure 7:
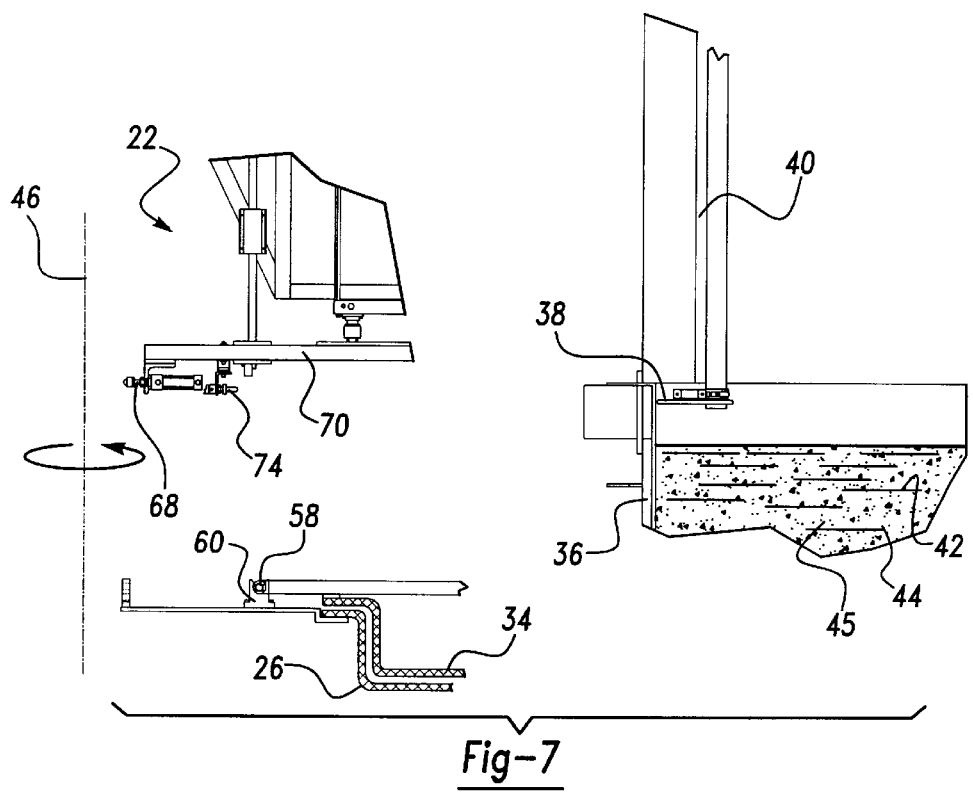
FIG. 7 is a partial sectional view of the work cell showing the pallet rotated beneath the pallet transfer mechanism.
Figure 8:
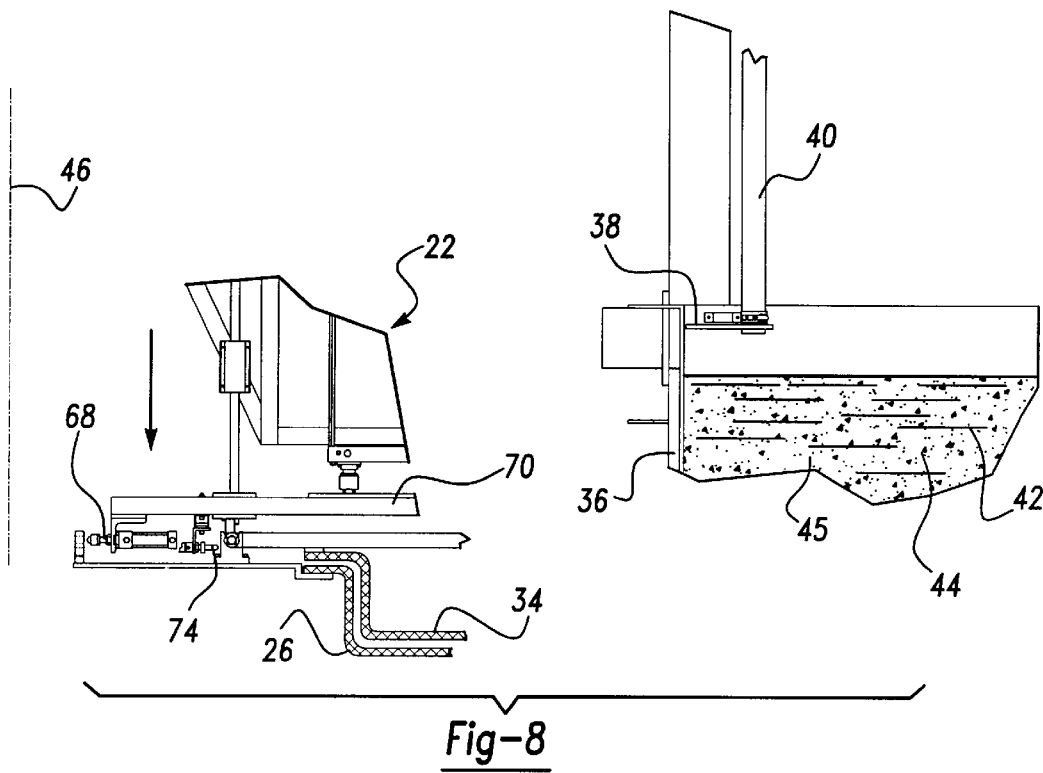
FIG. 8 is a partial sectional view of the work cell showing the transfer mechanism extending downward to engage the pallet.
Figure 9:
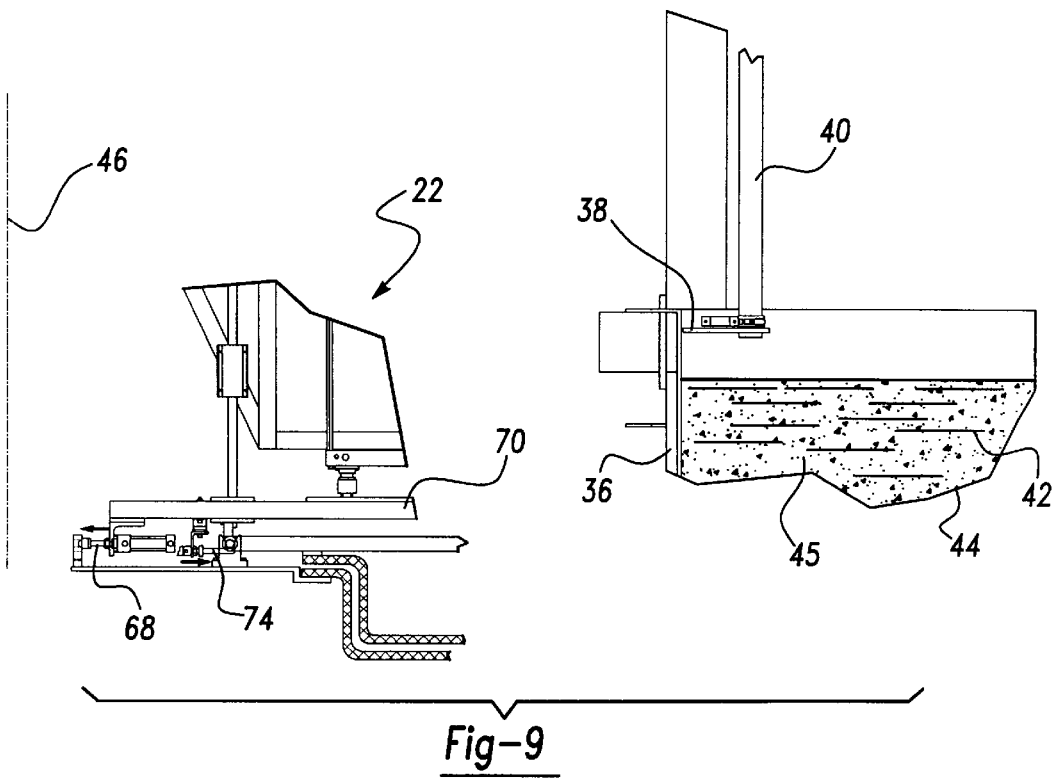
FIG. 9 is a partial sectional view of the work cell showing both inner and outer carriage pins in an extended position.
Figure 10:
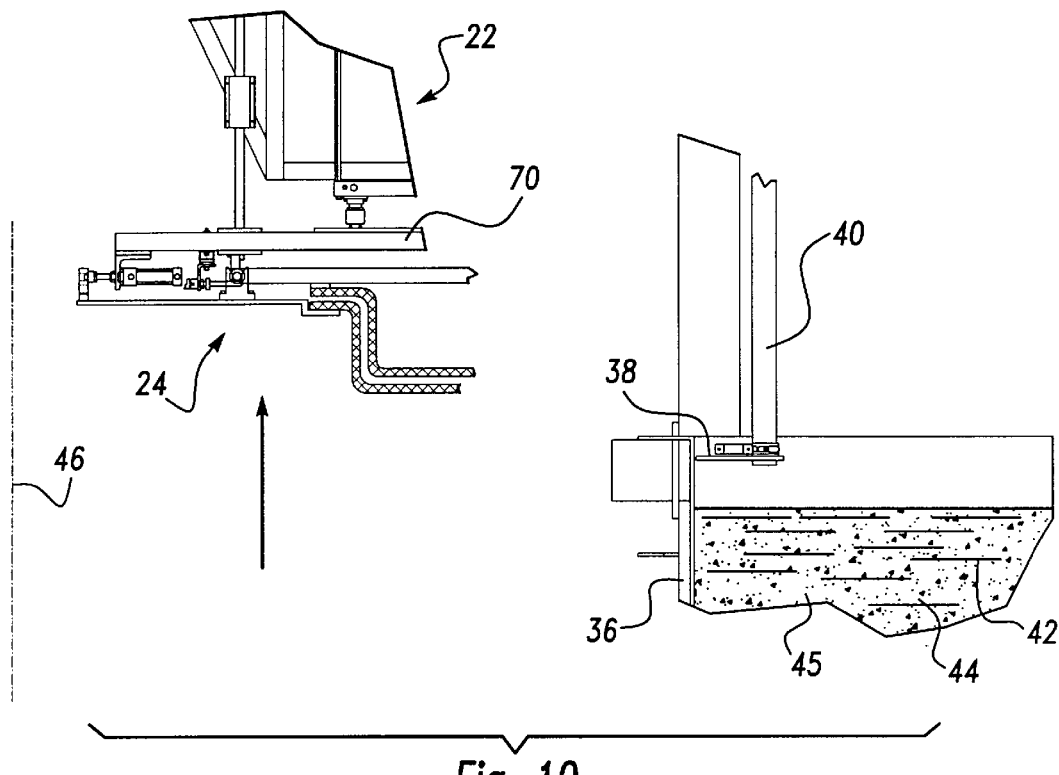
FIG. 10 is a partial sectional view of the work cell showing carriage and pallet assembly lifted from the plane of the turntable.
Figure 11:
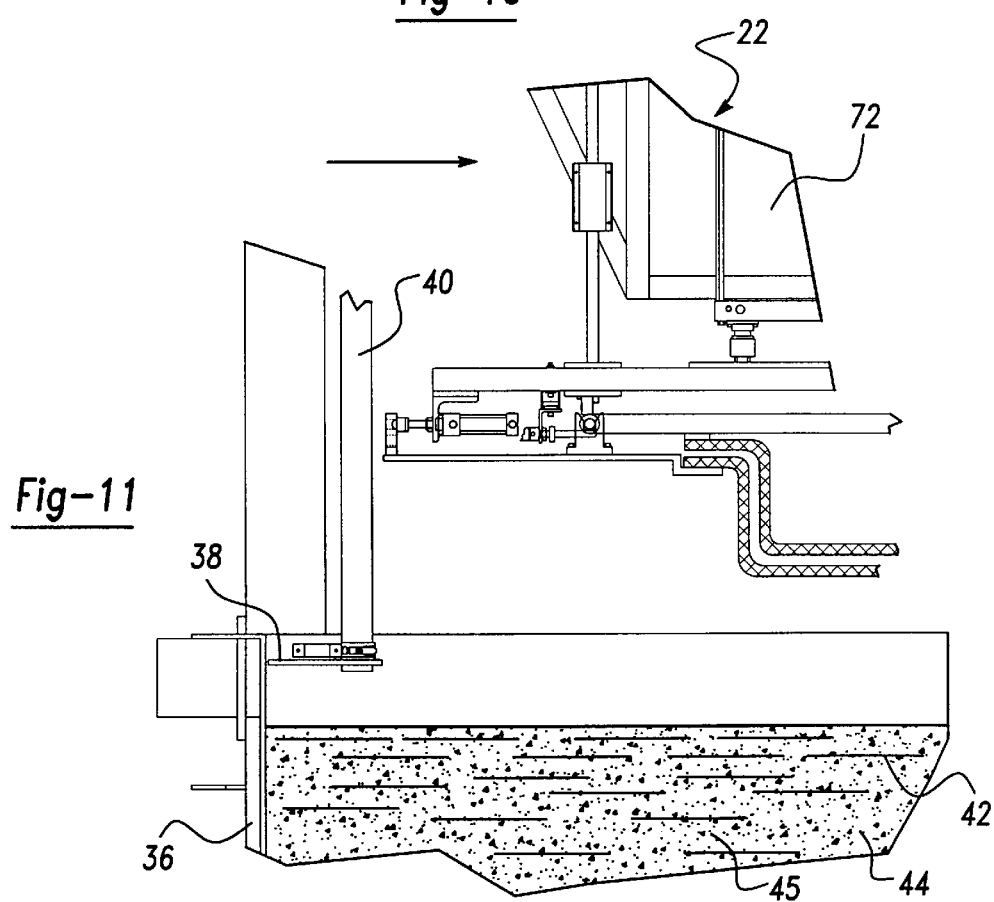
FIG. 11 is a partial sectional view of the tank station showing the pallet transfer mechanism as translated above the tank station.

Generally speaking, the process of creating fiber reinforced preforms begins by loading pallet 24 onto turntable 16, as shown in FIGS. 1 and 6. Mounted to pallet 24 is main screen 26, contoured in the shape of the component ultimately to be formed, having upright side walls 28, major surface 30, and a plurality of openings 32 therein. Retainer screen 34 is shaped to conform to at least the upright side wall portion 28 of main screen 26 and may conform to the entire contour of main screen 26 as shown in FIG. 6.

As shown in FIGS. 2 and 6–11, pallet transfer mechanism 22 is utilized to lift pallet 24 from turntable 16, translate the pallet from a position above turntable 16 to a position above a tank 36, and lower pallet 24 into tank 36. Referring to FIGS. 11–14, pallet 24 is disconnected from pallet transfer mechanism 22 and subsequently connected to wash plate 38. Wash plate 38 may be raised up and down within tank 36 by rotation of ball screws 40. Reinforcing fibers 42 and liquid 44 are added to tank 36 to create a slurry 45. Slurry 45 is mixed utilizing a mechanical stirring device or by a bubbler as discussed in commonly assigned U.S. Pat. No. 5,039,465, which is hereby incorporated by reference.

Figure 2:
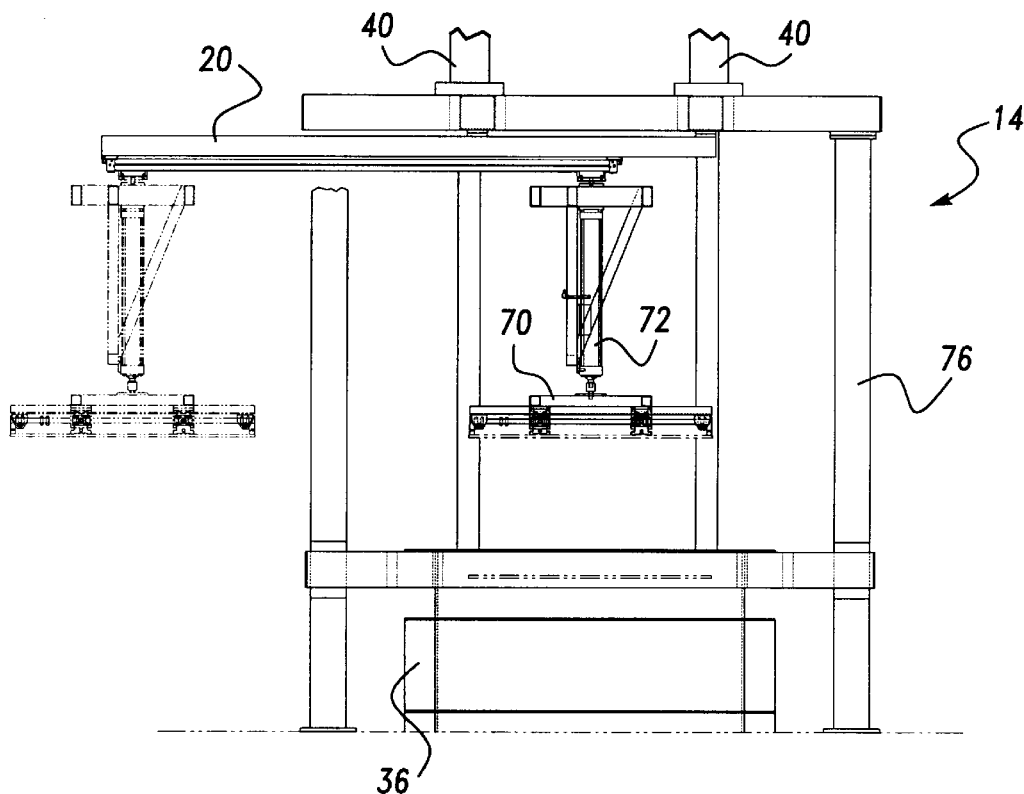
FIG. 2 is an enlarged side view of the tank station along with the pallet transfer mechanism located directly above the tank and also translated outside the gantry frame shown in phantom.
Figure 2A:
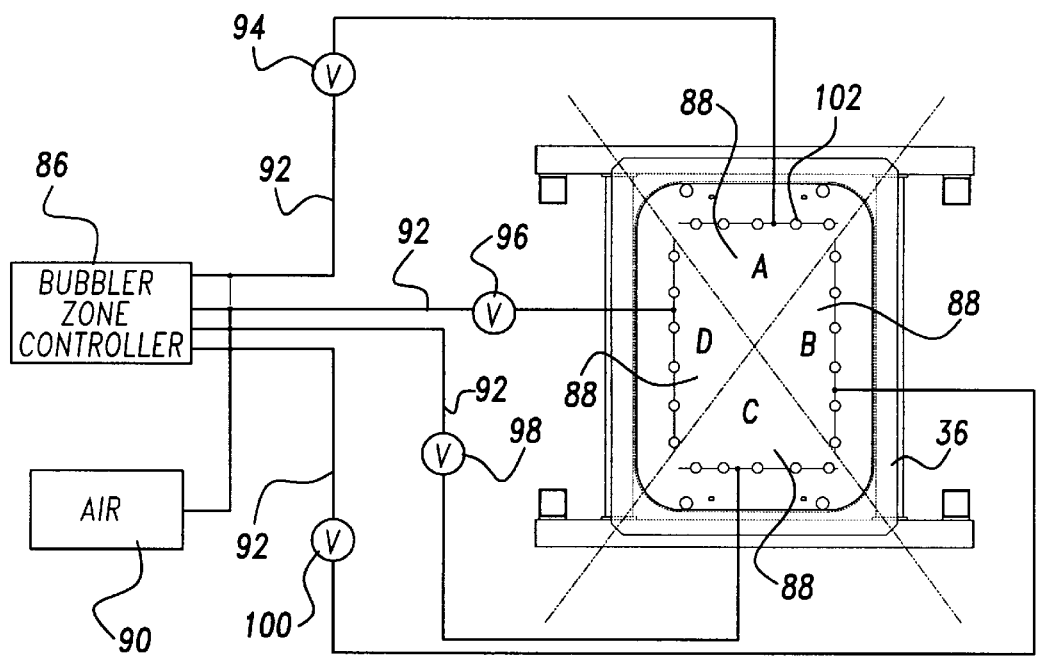
FIG. 2A is an overhead view of the tank showing the bubbler zone controller.

As shown in FIG. 2A, one embodiment of the present invention includes a bubbler zone controller 86 for regulating the supply of fluid, preferably air, sent to plurality of bubbler zones 88. Tank 36 is divided into at least two, but preferably four, bubbler zones 88, denoted A, B, C, and D. Air source 90 is connected to plurality of supply lines 92 located upstream of bubbler valves 94, 96, 98 and 100. In a portion of a typical sequence of operation, bubbler zone controller 86 commands bubbler valve 94 to open allowing air to pass to bubbler zone A. The air supplied to bubbler zone A escapes through plurality of openings 102 thereby mixing slurry 45 in zone A.

In standard operating mode, air pulses are sent to bubbler zones 88 in a certain sequence to assure a random mixing of slurry 45. For example, zone A and zone C are sent air for 3 seconds while zones B and D are turned off. Zones B and D are then activated for 3 seconds while zones A and C are off. This cycle repeats until preform 12 is removed from slurry 45. Without the use of the bubbler zone controller in its standard operating mode, a vortex forms in slurry 45 as main screen 26 is raised through tank 36. Depending on the geometry of preform 12, a vortex may be detrimental to the structural integrity of preform 12 because the swirling motion of slurry 45 washes reinforcing fibers 42 from upright side walls 28. On the other hand, in instances where preform 12 has little or no upright sidewall 28, a vortex is helpful in that it assists in sweeping reinforcing fibers 42 off of wash plate 38 and into main screen 26. In these cases, a vortex may be initiated by pulsing air into bubbler zones A through D in sequence of alphabetical order.

Figure 15:
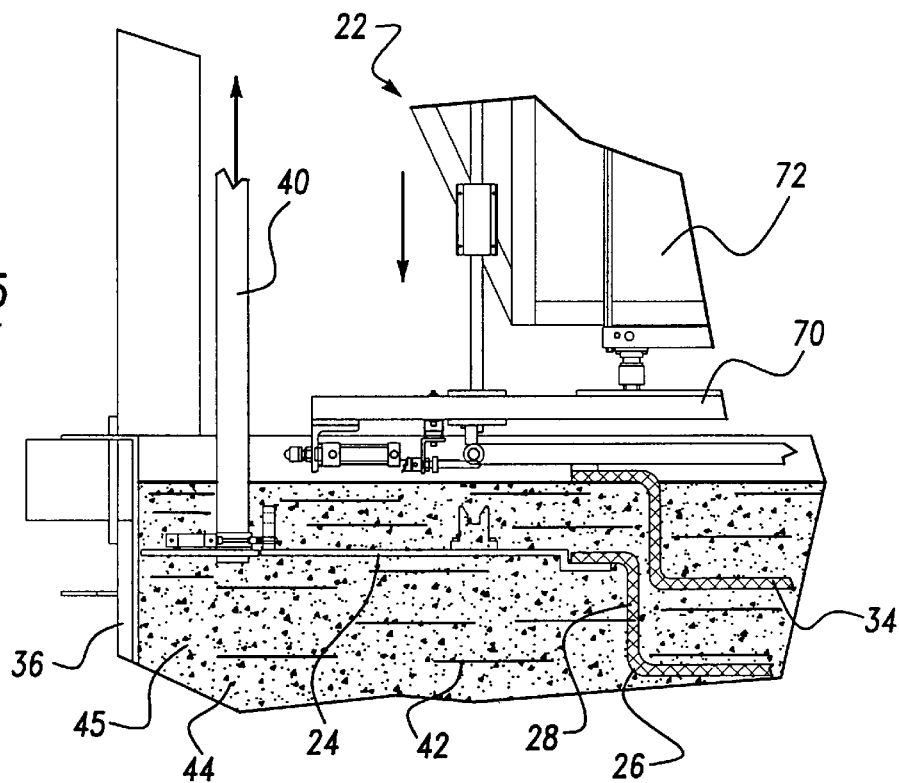
FIG. 15 is a partial sectional view of the tank station showing ball screws actuated in an upward motion drawing the screen through the slurry while the carriage is lowering the retainer screen into the slurry.
Figure 16:
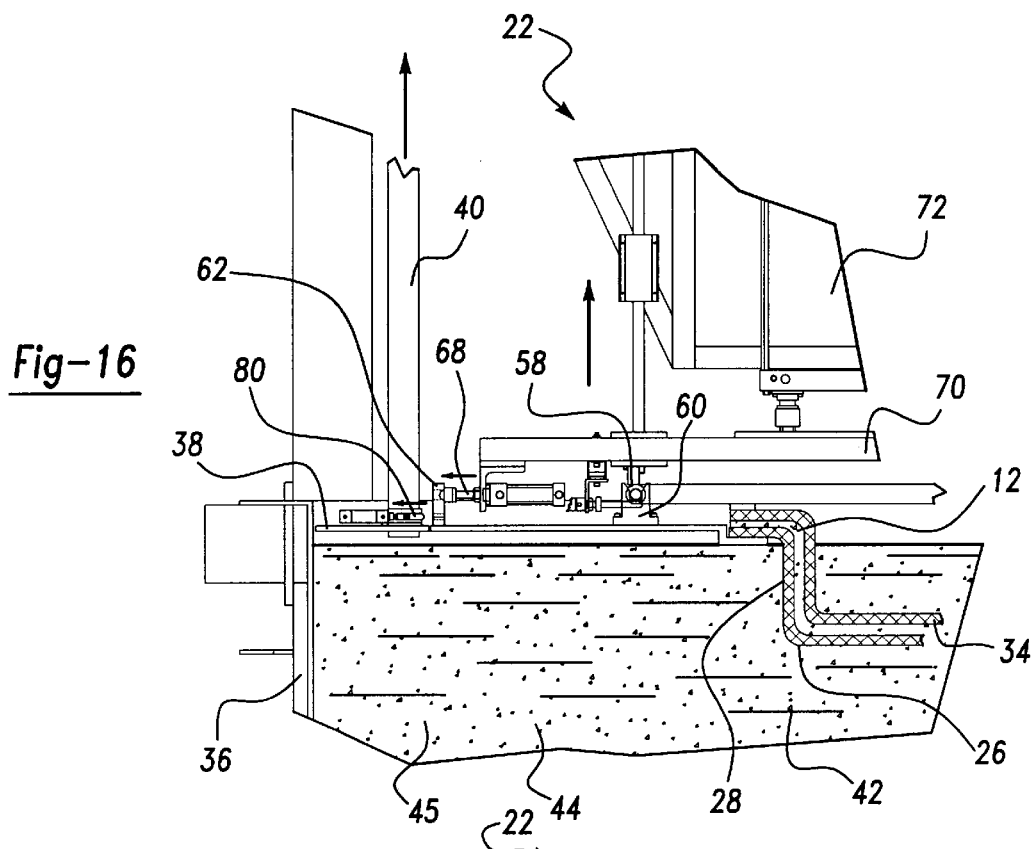
FIG. 16 is a partial sectional view showing tank pins retracted and outer carriage pins extended and retainer screen guide rod seated on retaining screen mounting blocks.
Figure 17:
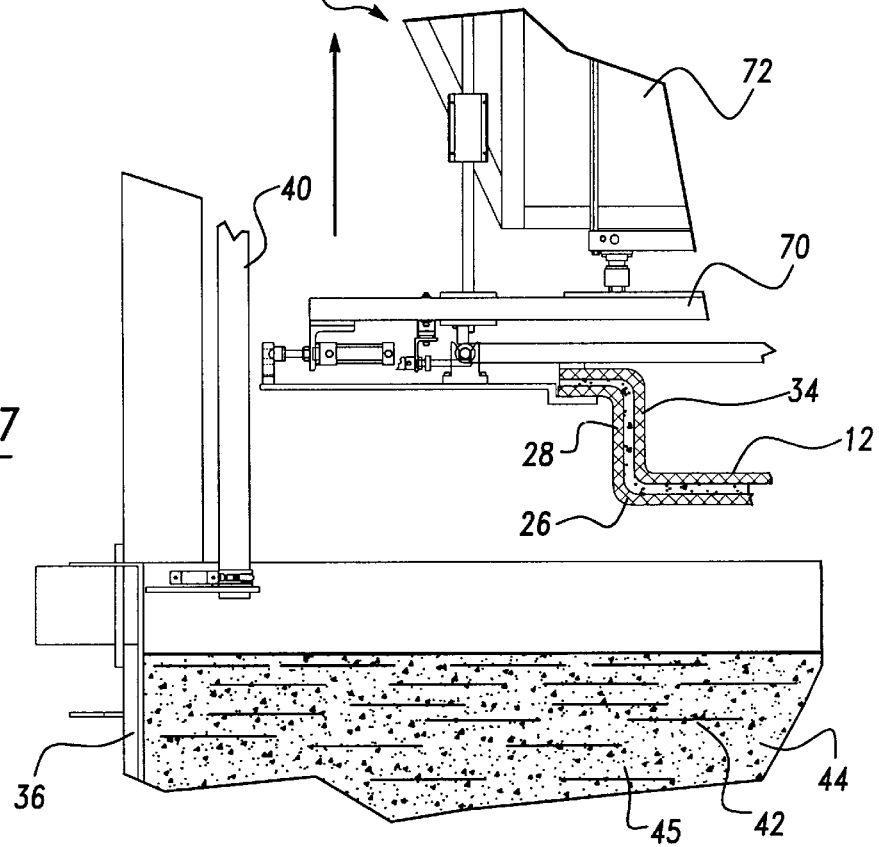
FIG. 17 is a partial sectional view showing retraction of the carriage and pallet assembly.

Referring now to FIGS. 15–17, pallet 24 including main screen 26 is initially lowered near the bottom of tank 36. Pallet 24 is then drawn upwards through tank 36 thereby forcing liquid 44 through plurality of openings 32 and depositing reinforcing fibers 42 upon main screen 26. Prior to main screen 26 breaking the plane of the surface of slurry 45, retainer screen 34 is inserted into slurry 45 such that reinforcing fibers 42 are sandwiched between main screen 26 and retainer screen 34. Retainer screen 34 is positioned to protect preform 12 from damage due to slurry 45 rushing over upright side walls 28 as main screen 26 is lifted out of slurry 45. Once retainer screen 34 is in place, both main screen 26 and retainer screen 34 are raised together out of slurry 45 by pallet transfer mechanism 22. As shown in FIGS. 1 and 2, pallet transfer mechanism 22 translates pallet 24 from above tank 36 to a position above turntable 16. Pallet 24 is lowered back onto turntable 16 in route to furnace 18. Turntable 16 is rotated 180° about an axis 46 to bring pallet 24 within close proximity of furnace 18. Any suitable transfer mechanism may be utilized to unload pallet 24 from turntable 16 and into furnace 18. Pallet 24 including main screen 26, retainer screen 34 and preform 12 is heated in furnace 18 to evaporate as much liquid 44 trapped between reinforcing fibers 42 as possible. Heated pallet 24 is then transferred to the cooling station, not shown, where air is forced through main screen 26, retainer screen 34 and preform 12 to cool pallet 24 and evaporate any remaining liquid 44. Retainer screen 34 is removed to provide access to preform 12 which is subsequently removed as one contiguous component.

Figure 18:
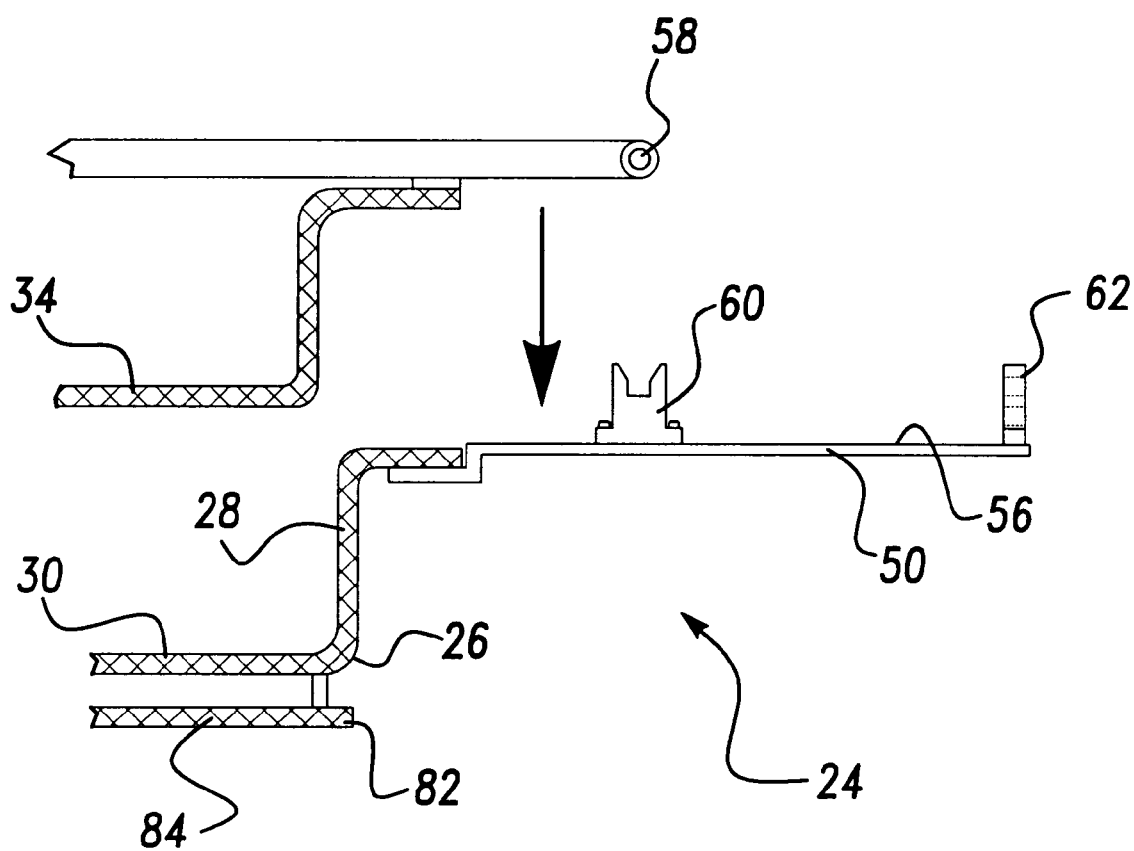
FIG. 18 is a partial sectional view showing the retainer screen, main screen, and auxiliary screen.

As shown in FIG. 18, an alternative embodiment of the invention includes an auxiliary screen 82 positioned beneath at least a portion of main screen 26. Auxiliary screen 82 acts as a choke effectively reducing the amount of liquid 44 forced through the plurality of openings 32 in main screen 26. The choke serves to divert the flow of liquid 44 such that the amount of liquid passing through major surface 30 is approximately equal to that of the amount of liquid 44 passing through upright side walls 28. Because the quantity of reinforcing fibers 42 deposited on main screen 26 is proportional to the amount of liquid 44 allowed to pass through the plurality of openings 32, equal flow rates of liquid 44 through different portions of main screen 26 will produce a preform 12 of substantially uniform wall thickness. Auxiliary screen 82 also has a plurality of openings 84 which may be shaped, sized or positioned differently than the plurality of openings 32 in main screen 26 as long as auxiliary screen 82 restricts the flow of liquid 44 through main screen 26. One example of auxiliary screen 82 constructed per the present invention utilizes the plurality of openings 84 in auxiliary screen 82 positioned in misalignment relative to the plurality of openings 32 within main screen 26. This misalignment is purposeful to provide a tortuous path for liquid 44 to follow, thereby choking the flow of liquid 44 through main screen 26.

Figure 19:
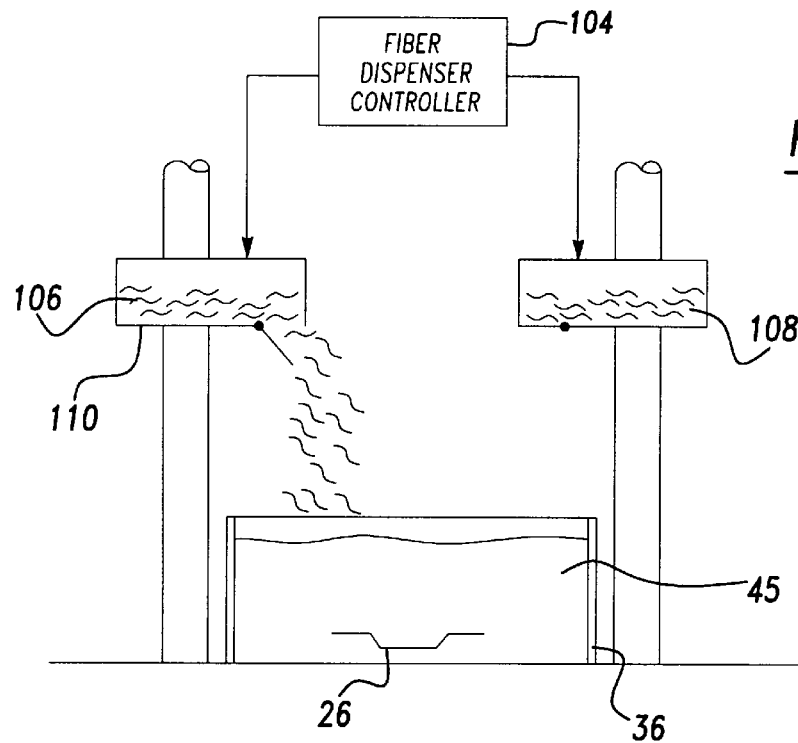
FIG. 19 is a side view showing the fiber dispenser system with a first set of fibers entering the slurry.
Figure 20:
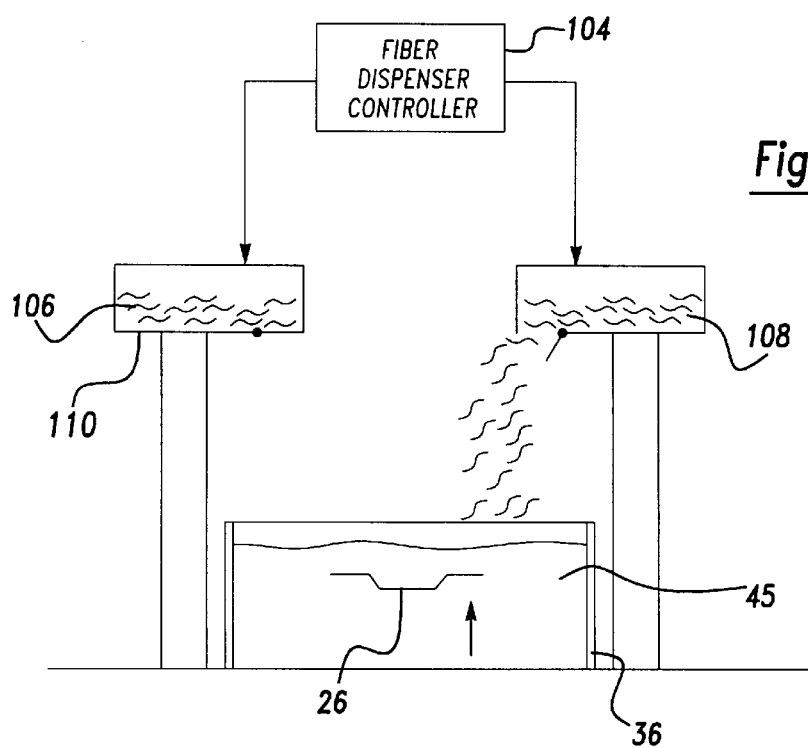
FIG. 20 is a side view showing the fiber dispenser system with a second set of fibers entering the slurry.

Another embodiment of the invention, shown in FIGS. 19 and 20, includes a fiber dispenser controller 104 for introducing more than one type of fiber into slurry 45. Depending on the final component to be created, dispenser controller 104 regulates the quantity of a first set of fibers 106 to be added to slurry 45. Dispenser controller 104 acts in concert with the mechanism utilized to draw main screen 26 through tank 36 such that first set of fibers 106 is added when main screen 26 is near the bottom of tank 36. As main screen 26 is raised through slurry 45, first set of fibers 106 forms the first layer of preform 12. As shown in FIG. 20, main screen 26 continues to rise through slurry 45 while fiber dispenser controller 104 closes off the supply of first set of fibers 106 and introduces a second set of fibers 108 into slurry 45. The addition of fibers with different characteristic physical properties such as fiber length, fiber diameter, chemical composition, tensile strength and conductivity in this manner produces a stratified preform 12 that may be custom tailored to a final application.

For example, components that require only one aesthetically pleasing exterior surface, such as an oil pan or housing cover, may be constructed using a cosmetically appealing material on that surface alone while the remaining layers of the structure comprise a less costly material. Similarly, component impact resistance may be optimized by incorporating layers of fibers with different tensile strengths into preform 12. If high bending strength and low cost are required, a multiple layered composite with at least three layers may be specifically designed to meet those needs in a cost effective manner. The outside layers would be constructed from higher strength fibers while the lower stress center layers would consist of lower strength, lower cost fibers. Another example showcasing the versatility of this invention includes a component with a layer of high electrical conductivity among layers of material with lower electrical conductivity. This objective may be achieved by using a set of fibers with high electrical conductivity or by addition of particles with high electrical conductivity to one of the fiber supply bins 110.

B. Details of Apparatus and Method

To further assist the reader, the preferred apparatus and method are now described in further detail. In reference to FIGS. 1 and 6, pallet 24 includes main screen 26 having upright side walls 28, major surface 30, and a plurality of openings 32 therein, positioned in an aperture 48 of a mask 50. The inner portion of mask 50 defining aperture 48 is provided with an offset surface 52 allowing an extending lip 54 of main screen 26 to fit flush with a planar surface 56 of mask 50. Guide rods 58 are attached to retainer screen 34. Retainer screen mounting blocks 60 are secured to mask 50 and are designed in such a manner as to position retainer screen 34 relative to main screen 26 once guide rods 58 engage retainer screen mounting blocks 60.

Figure 3:
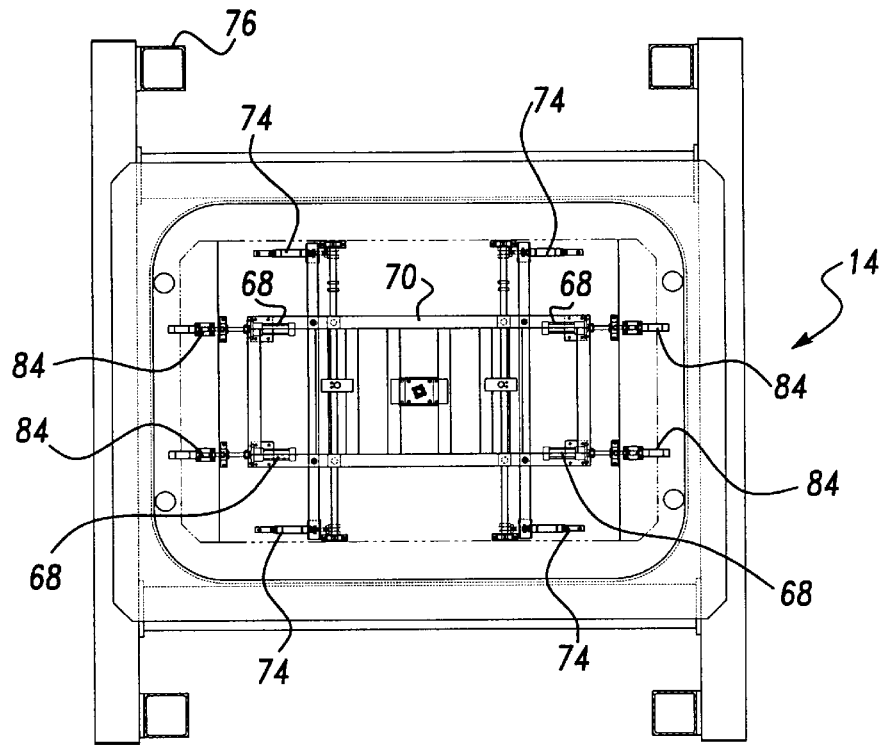
FIG. 3 is an enlarged top view of the tank station with the pallet and pallet transfer mechanism located over the tank.
Figure 5:
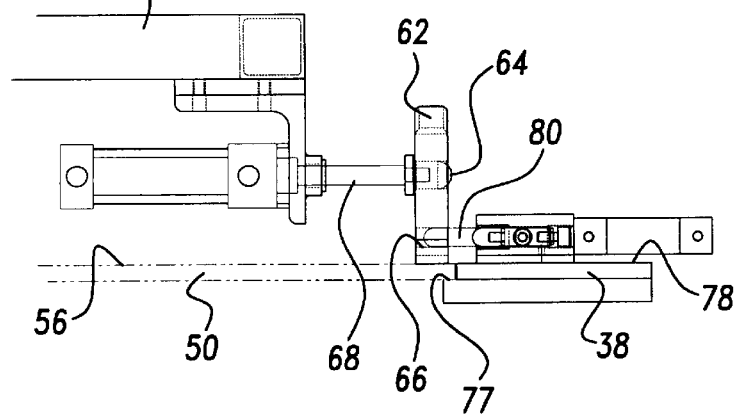
FIG. 5 is a side view of a portion of the tank station showing an outer carriage pin and a tank pin engaged with a transfer block.

To facilitate movement of pallet 24 from turntable 16 to tank 36, transfer blocks 62 are also fixedly mounted to mask 50. As shown in FIG. 5, each transfer block 62 contains upper aperture 64 and lower aperture 66. As shown in FIGS. 1, 3 and 5, upper apertures 64 are oriented to cooperate with outer carriage pins 68 mounted to a carriage 70. Once outer carriage pins 68 have engaged upper apertures 64, pallet 24 may be lifted using carriage 70 in conjunction with a hydraulic ram 72. Hydraulic ram 72 is capable of raising and lowering carriage 70 relative to turntable 16 and tank 36. Carriage 70 and hydraulic ram 72 may be translated from a position above turntable 16 to a position above tank 36 and back again by utilizing parallel rails 20 of tank station 14.

Figure 4:
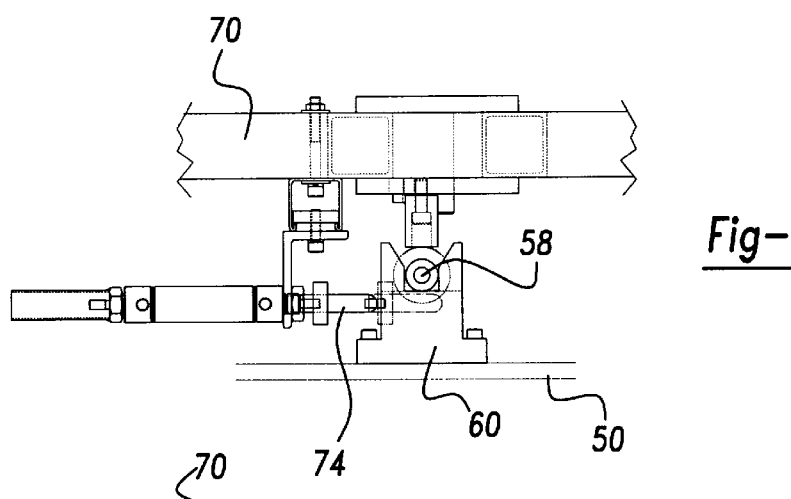
FIG. 4 is a side view of a portion of the pallet transfer mechanism with inner carriage pins extended.
Figure 12:
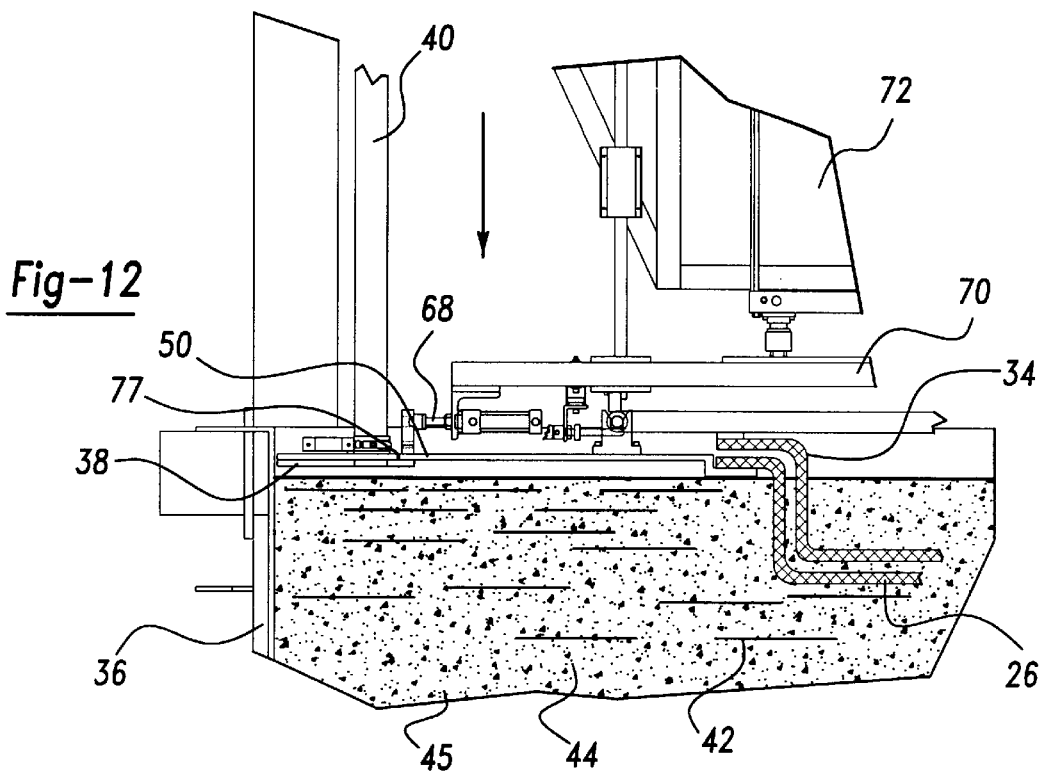
FIG. 12 is a partial sectional view of the tank station showing pallet lowered to engage the wash plate.
Figure 13:
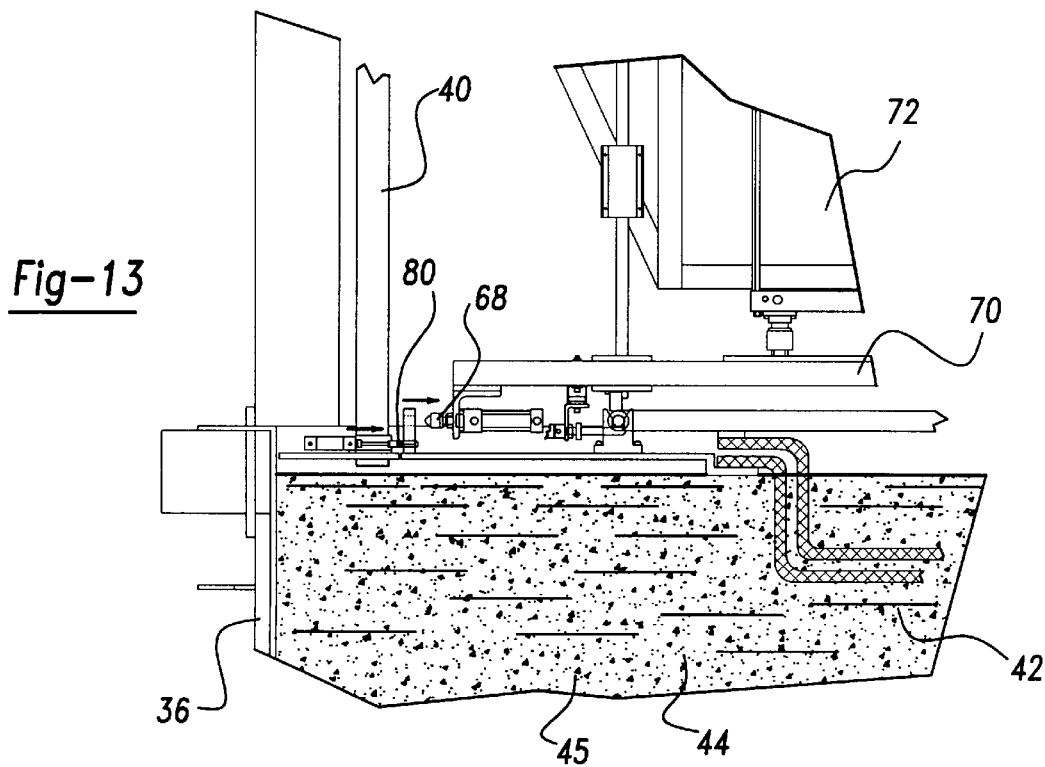
FIG. 13 is a partial sectional view of the tank station showing outer carriage pin retracted and tank pin expended, thereby connecting pallet with the wash plate.
Figure 14:
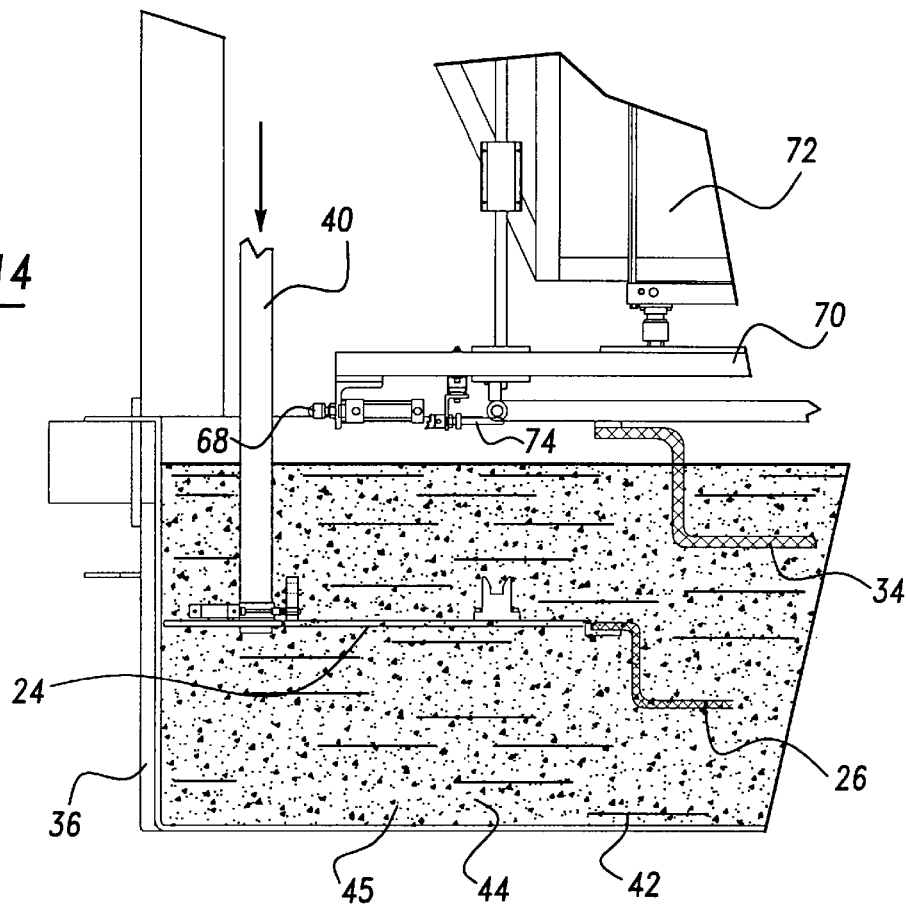
FIG. 14 is a partial sectional view of the tank station showing the ball screws actuated in a downward motion to position the main screen at the bottom of the tank.

In reference to FIGS. 1 and 7–9, turntable 16 is rotated about axis 46 such that main screen 26 is positioned beneath carriage 70. Carriage 70 is lowered into position by extension of hydraulic ram 72. Outer carriage pins 68 are extended to engage the upper apertures 64 of transfer blocks 62. FIG. 4 shows inner carriage pins 74 extended beneath guide rods 58 to support the weight of retainer screen 34. As shown in FIGS. 1, 2 and 10–12, carriage 70 and pallet 24 are now sufficiently interconnected to lift pallet 24 from turntable 16. Carriage 70 along with pallet 24 is translated along parallel rails 20 into position over tank 36. Hydraulic ram 72 is actuated once again to lower carriage 70. Wash plate 38 is attached at four locations to individual ball screws 40 which are in turn mounted to a gantry frame 76. The position of wash plate 38 within tank 36 is controlled utilizing ball screws 40. As shown in FIGS. 5 and 12, carriage 70 is lowered until mask 50 engages offset surface 77 of wash plate 38. Once mask 50 is seated, surface 56 is substantially coplanar with upper planar surface 78 of wash plate 38. As shown in FIGS. 13 and 14, outer carriage pins 68 are retracted, thereby disengaging main screen 26 from carriage 70. Fixedly mounted to wash plate 38, tank pins 80 are extended to engage lower apertures 66 of transfer blocks 62. Main screen 26 is lowered into tank 36 by actuating ball screws 40. While main screen 26 is being lowered into tank 36, hydraulic ram 72 holds carriage 70 stationary. Retainer screen 34 is held partially above slurry 45 by inner carriage pins 74.

As shown in FIGS. 15–17, preform 12 is created by drawing main screen 26 through slurry 45 at a rate that causes the liquid to pass through the openings in main screen 26, thereby depositing reinforcing fibers 42 on the surface of main screen 26. As main screen 26 is being raised, hydraulic ram 72 is actuated in a downward motion to insert retainer screen 34 into slurry 45. Ball screws 40 continue to raise main screen 26 until retaining screen mounting blocks 60 engage guide rods 58. At this time, tank pins 80 are retracted, thereby disconnecting wash plate 38 from carriage 70. Outer carriage pins 68 are extended to once again engage the upper apertures 64 of transfer blocks 62. Hydraulic ram 72 is actuated to lift carriage 70 along with main screen 26 and retainer screen 34. Carriage 70 translates via parallel rails 20 to its original position above turntable 16.

Referring once again to FIG. 1, carriage 70 is lowered via hydraulic ram 72 onto turntable 16. Both inner and outer carriage pins, 74 and 68, respectively, are retracted effectively disconnecting the carriage from screens 26 and 34. Carriage 70 is raised out of the way via hydraulic ram 72. Turntable 16 is rotated 180° about axis 46 to facilitate unloading of pallet 24 from turntable 16 and into furnace 18 or any other suitable drying device. Pallet 24 is transferred to cooling station, not shown, where a fan is used to draw air through preform 12 and screens 26 and 34. Once screens 26 and 34 have cooled, retainer screen 34 is lifted off and preform 12 may be removed. Preform 12 is now suitable for further conventional processing such as RTM in order to form a final component.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for forming a fiber reinforced structure comprising:

placing a main screen having a selected preform shape in a tank filled with a liquid said tank having sidewalls, the main screen having a major surface, and upright sidewalls extending from said major surface;

adding reinforcing fibers to the liquid to create a slurry;

raising the main screen through the slurry to a level beneath the top of the slurry causing the reinforcing fibers to be deposited on the main screen thereby creating a preform, the main screen raised by means of a pallet supported and secured to the main screen, said pallet extending from the main screen to the tank sidewalls;

inserting a retainer screen into the slurry above the main screen such that at least a portion of the preform is positioned between the main screen and the retainer screen whereby the reinforcing fibers of the preform are retained in place the retainer screen positioned and sized such that slurry is allowed to pass between the retainer screen and the tank sidewalls; and simultaneously raising both the main screen and the retainer screen out of the tank with at least a portion of the preform supported therebetween whereby deformation of the preform is minimized as the main screen is raised from the tank.

2. The method of claim 1 further comprising the step of positioning a choke screen adjacent the main screen, the choke screen having openings formed therein which are sized differently than the openings in the main screen.

3. The method of claim 1 further comprising the step of positioning a choke screen adjacent the main screen, the choke screen having openings formed therein which are offset from the openings in the main screen thereby restricting liquid flow.

4. The method of claim 1 wherein the main screen has a contoured major surface.

5. The method of claim 1 wherein the step of inserting a retainer screen is carried out with a retainer screen generally complementary in shape to at least a portion of the upright side walls of the main screen.

6. The method of claim 1 wherein the step of inserting a retainer screen is carried out with a retainer screen generally complementary in shape to at least a portion of the major surface of the main screen.

7. A method for forming a fiber reinforced structure comprising:

placing a main screen in a tank filled with a liquid, the main screen having a major surface, upright side walls and a plurality of openings formed therein;

positioning a choke screen spaced apart from the major surface of the main screen, the choke screen having a plurality of openings formed therein;

adding reinforcing fibers to the liquid to create a slurry; and raising the main screen and the choke screen through the slurry causing the liquid to flow through the openings in the main screen and subsequently through the openings in the choke screen whereby flow of the liquid through the main screen is selectively restricted by the choke screen thereby creating a preform having uniform thickness.

* * * * *